Figure 1:
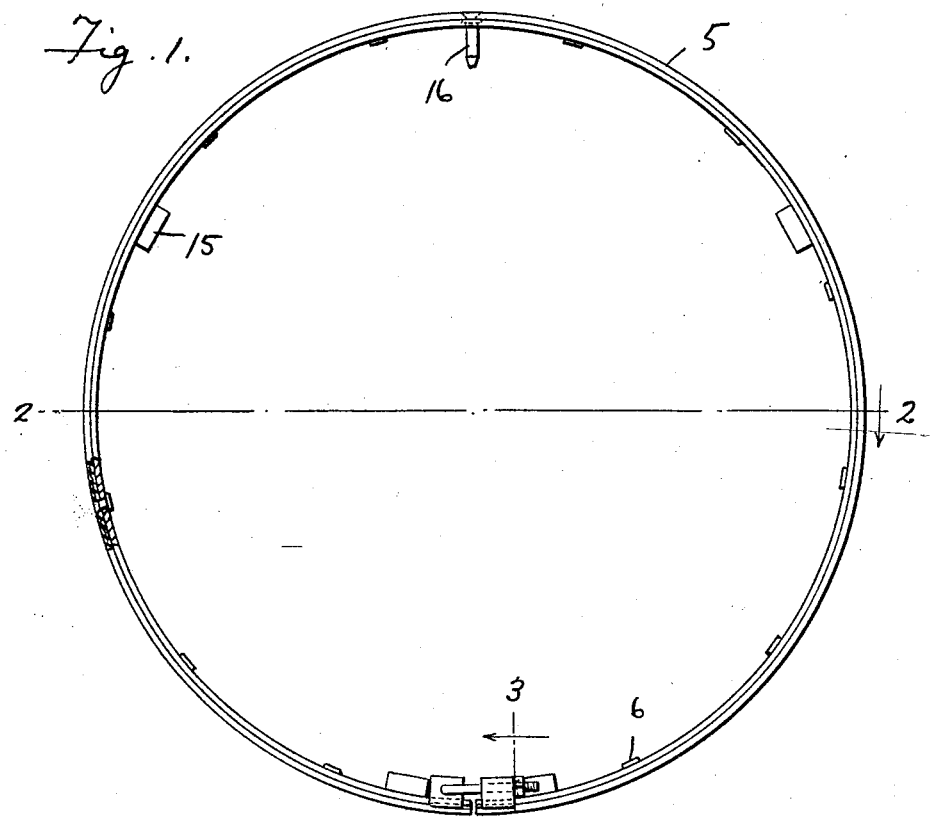

June 9, 1931.   A. W. FITZ   1,808,979
EMERGENCY RIM AND PROTECTOR
Filed Sept. 11, 1928

Inventor
A. W. Fitz
By Clarence A. O'Brien
Attorney

Patented June 9, 1931

1,808,979

UNITED STATES PATENT OFFICE

ANDREW W. FITZ, OF COUNCIL BLUFFS, IOWA

EMERGENCY RIM AND PROTECTOR

Application filed September 11, 1928. Serial No. 305,213.

The present invention relates to an emergency rim and protector and the purpose of the device is to preserve the rims of automobile wheels when the same are exposed to bare surfaces of roads, especially paved streets, should the automobilist have a blow out and find it necessary to drive any distance to have the tire fixed for service again.

This rim protecting device also takes the place of the spare tire, being constructed so as to give the effect of a solid tire in place of a pneumatic.

A very important object of the invention resides in the provision of a device of this nature which may be easily and quickly attached to and detached from the rim on an automobile wheel.

A still further very important object of the invention resides in the provision of a device of this nature which is exceedingly simple in its construction, inexpensive to manufacture, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
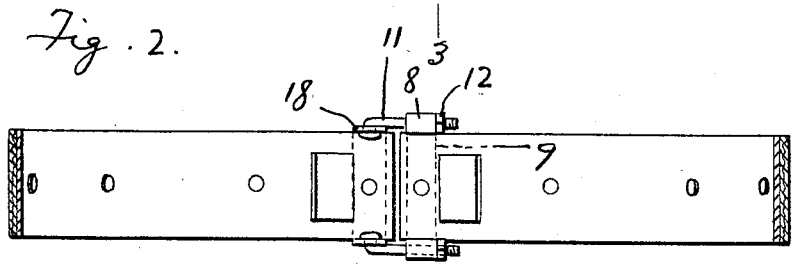
Figure 3:
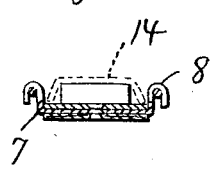

In the drawings:

Figure 1 is a side elevation of the device embodying the features of my invention showing a small portion in section, Figure 2 is a sectional view taken substantially on the line 2—2 of Figure 1, and Figure 3 is a detail sectional view taken substantially on the line 3—3 of Figure 1.

Referring to the drawings in detail, it will be seen that the numeral 5 denotes a split circular emergency rim which in the present instance is made of two-ply laminations riveted together as is indicated at 6 or otherwise secured together. A plate 7 is disposed transversely between the laminations at one end of the split emergency rim and has inwardly directed hooked terminals 8.

A cross plate 9 is disposed between the laminations at the other end of the emergency rim and terminates in ears 18 inwardly directed and having bolts 11 pivotally engaged therewith so that they may be inserted in the hooks 8 as is indicated to advantage in Figure 3 and then nuts 12 may be threaded thereon to draw the ends of the split rim together so that the rim may be tightened about the automobile rim 14.

On the inside of the emergency rim 5 there are distributed a plurality of blocks 15 to be disposed in the channel of the rim 14 as is clearly illustrated in Figure 3.

The emergency rim is also provided with an inwardly directed projection or lug 16 to pass through the tire valve opening in the rim and felly so as to prevent the emergency rim from slipping about the wheel rim.

From the above detailed description it will be seen that I have devised a simple emergency rim structure that may be quickly assembled on a wheel rim and disassembled therefrom. The structure may obviously be manufactured strong and durable and yet at a very reasonable cost. This structure takes the place of a spare tire and prevents injury to the wheel rim.

It is thought that the construction, utility and advantages of this invention will now be quite apparent to those skilled in this art without a more detailed description thereof.

The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An emergency tire and protector for automobile tire rims of the character described comprising a resilient split band including inner and outer laminations and an intermediate lamination, the intermediate lamination having its ends spaced inwardly from the ends of the inner and outer laminations, means securing the laminations together, a flat metallic strap extending transversely between the inner and outer laminations in one end portion of the bands and anchored therein adjacent one end of the intermediate lamination, said strap projecting laterally from the sides of the band, integral, substantially U-shaped hooks on the ends of the strap, a flat metallic strap extending transversely between the inner and outer laminations in the other end portion of the band and anchored therein adjacent the other end of the intermediate lamination, right angularly disposed, integral, apertured ears on the ends of the second named strap, and means pivotally connected to the ears and adjustably engageable with the hooks for detachably connecting the ends of the band together in a manner to draw said ends toward each other.

In testimony whereof I affix my signature.

ANDREW W. FITZ.